(12) United States Patent
Meinel et al.

(10) Patent No.: US 7,707,084 B1
(45) Date of Patent: Apr. 27, 2010

(54) SYSTEM AND METHOD FOR TESTING HEDGE EFFECTIVENESS

(75) Inventors: Christoph M. Meinel, Heidelberg (DE); Gordon N. Seiffart, Dossenheim (DE); Julius F. Fetthauer, Zürich (CH); Georg J. Reiser, Reilingen (DE)

(73) Assignee: SAP AG, Walldorf (DE)

( * ) Notice: Subject to any disclaimer, the term of this patent is extended or adjusted under 35 U.S.C. 154(b) by 1285 days.

(21) Appl. No.: 10/866,743

(22) Filed: Jun. 15, 2004

(51) Int. Cl.
*G06Q 40/00* (2006.01)

(52) U.S. Cl. .................. 705/35; 705/37; 705/36 R

(58) Field of Classification Search .............. 705/35–45
See application file for complete search history.

(56) References Cited

U.S. PATENT DOCUMENTS

| | | | |
|---|---|---|---|
| 2002/0032624 A1* | 3/2002 | Yang et al. | 705/30 |
| 2002/0111891 A1* | 8/2002 | Hoffman et al. | 705/36 |
| 2003/0177077 A1* | 9/2003 | Norman | 705/35 |

OTHER PUBLICATIONS

Finnerty and Grant; Alternative Approaches to Testing Hedge Effectiveness under SFAS133; Accounting Horizons, Jun. 2002.*

JP Morgan; Heat: A framework for evaluating hedge effectiveness Jul. 2003.*

Hedge Effectiveness Testing Using Regression Analysis, Kawaller; AFP exchange Sep. Oct. 2002.*

Louis Schleifer "A New Twist to Dollar Offset" International Treasurer Jun. 2001 pp. 1-5.

* cited by examiner

*Primary Examiner*—Hani Kazimi
*Assistant Examiner*—Abhishek Vyas
(74) *Attorney, Agent, or Firm*—Kenyon & Kenyon LLP

(57) ABSTRACT

In one embodiment, systems and methods are disclosed to select a hedge from a plurality of hedges, select a first test method from a plurality of test methods, calculate a first indicia of hedge effectiveness using the first test method, store the first indicia of hedge effectiveness, repeat the calculating and the storing for each of the plurality of test methods; and determine a final indicia of hedge effectiveness by applying the stored plurality of indicia to a rule set. In another embodiment, systems and methods are disclosed to further perform an initial test to determine if additional, more complex tests are required. Embodiments disclosed herein may also display the state or meaning of a final effectiveness indicator to a user.

18 Claims, 2 Drawing Sheets

SYSTEM AND METHOD FOR TESTING HEDGE EFFECTIVENESS

BACKGROUND

1. Technical Field

Embodiments of the present invention generally relate to automated computer systems. More particularly, embodiments relate to automated computer systems used to test the effectiveness of hedge transactions.

2. Discussion

"Hedging" is a banking principle in which a bank offsets risk present in a first set of financial instruments (a.k.a. hedged items) with risks from a second set of financial instruments (a.k.a. hedging items). Types of financial instruments are selected such that, when risk rises in the first set of instruments, the risks of the second set of instruments typically falls. Hedging, therefore, provides a set of checks and balances to a bank's financial management operations.

A hedge ratio is one measure of the effectiveness of a hedge. A conventional hedge ratio is a ratio of the value of the hedged items divided by the value of the hedging items. In the United States, governing law may mandate hedging ratios. In several European countries, governing law mandates hedging ratios. Even if governing law does not mandate hedging ratios, fiduciaries may want to evaluate hedging transactions to ensure that a satisfactory ratio is maintained. The specifics of the legal and fiduciary requirements relating to hedge transactions in the United States and countries foreign to the United States are not important for the present discussion.

BRIEF DESCRIPTION OF THE DRAWINGS

The various advantages of embodiments of the present invention will become apparent to one skilled in the art by reading the following specification and appended claims, and by referencing the following drawings, wherein like reference numerals identify like items.

DETAILED DESCRIPTION

The present invention provides an automated tool to test the effectiveness of hedge transactions.

Figure 1:
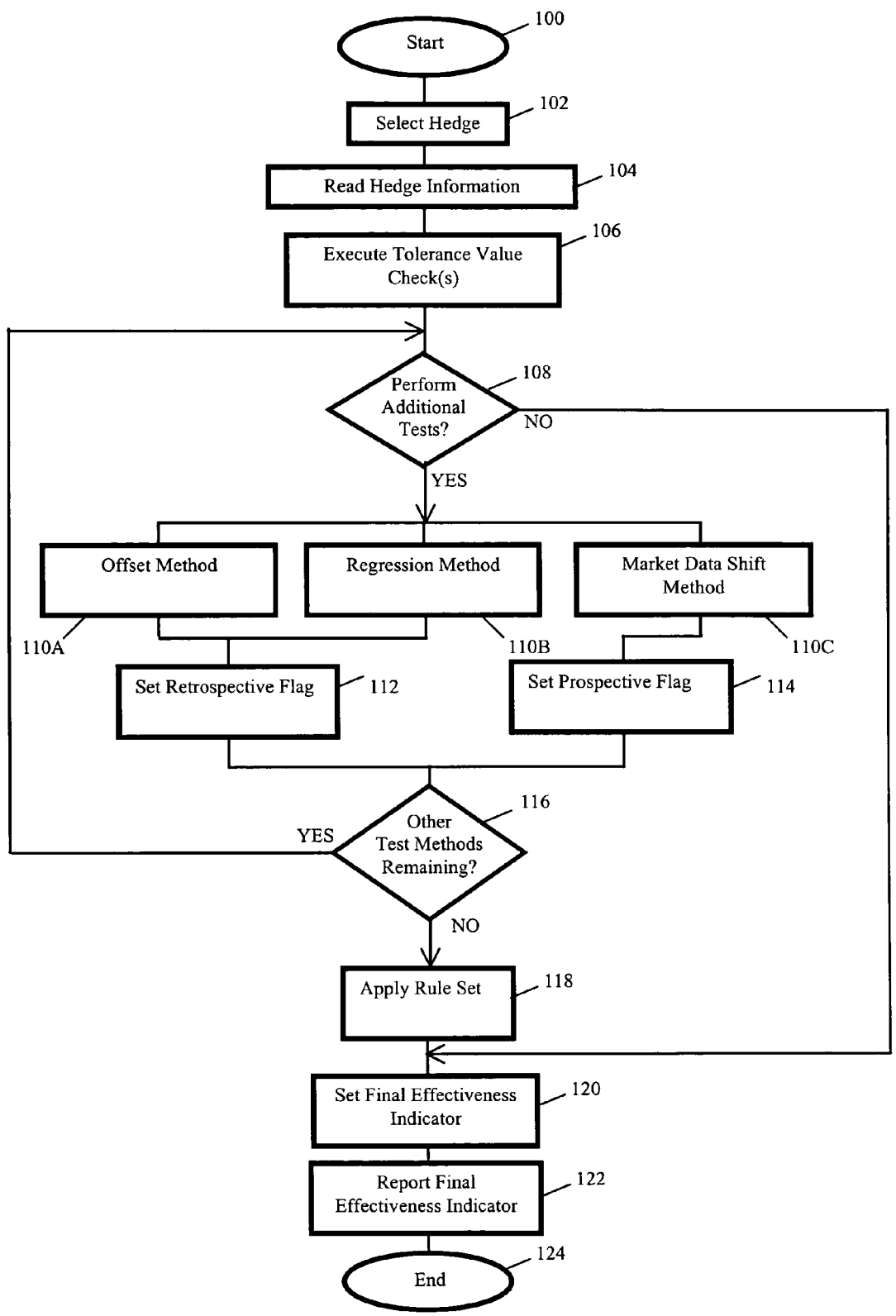
FIG. 1 is a flow diagram of a method in accordance with an embodiment of the invention.

FIG. 1 illustrates a method in accordance with an embodiment of the invention. The method may begin at 100. At 102, a hedge may be selected to test its effectiveness. At 104, information for the selected hedge may be read from a memory (e.g., 206, FIG. 2). At 106, one or more initial tests, also known as tolerance value checks, may be executed to determine if additional, possibly more computationally complex tests, are required. At 108, the results of the one or more initial tests may be evaluated and if additional tests are not required, then the method may continue to 120, where a final effectiveness flag may be set. If, at 108, additional tests are required, then the method may continue to 110A, 110B, 110C, where additional tests may be executed. Each test 110A, 110B, 110C may set a retrospective flag or prospective flag, 112, 114, as determined by the nature of the test itself. At 116, a determination may be made as to whether all test methods from the plurality of test methods (here exemplified by 110A, 110B, and 110C) have been executed. If, at 116, all test methods of the plurality of test methods have not been executed, then the method may return to 108, or to a test method 110A, 110B, 110C, that has not yet been executed. If, at 116, all test methods from the plurality of test methods have been executed, then at 118, a rule set for a final effectiveness indicator may be applied to the set of test results. At 120, a final effectiveness indicator, such as a flag, may be set. The final effectiveness indicator may indicate whether the selected hedge is effective or ineffective. In another embodiment, the final effectiveness indicator may be set to indicate whether the selected hedge is effective, ineffective, or whether at least one error occurred in the execution of any of the plurality of test methods 110A, 110B, 110C. At 122, the final effectiveness indicator, or text or a graphic indicative of the state of or meaning of the indicator, may be displayed or other wise made known or reported to a user. Identification to the user may involve use of an Input/Output Unit, similar to 204, FIG. 2 coupled to a processor similar to 202, FIG. 2. The report may be stored in a report database, which may be stored in a memory similar to 206, FIG. 2. At 124, the method may end.

It is noted that as used herein the word "hedge" may refer to an entire hedging relationship. It is further noted that a test for the effectiveness of a hedge is conversely a test for the ineffectiveness of a hedge. Accordingly, a test for the effectiveness of a hedge may yield at least one of two results; the hedge may be effective or ineffective.

Returning now to 104, information for the selected hedge may include a hedge start date, stop date, and basis currency. Basis currency may be included to allow conversion from one currency (e.g., Euros) to another currency (e.g., United States Dollars). It is noted that other information may be included. The retrieved information may include information that can be used to customize the hedge and/or any methods used to test the effectiveness of the hedge. For example, a designation of test method(s) to test the hedge may be included as one way of determining which of the plurality of test methods to select for testing the effectiveness of the hedge.

Figure 2:
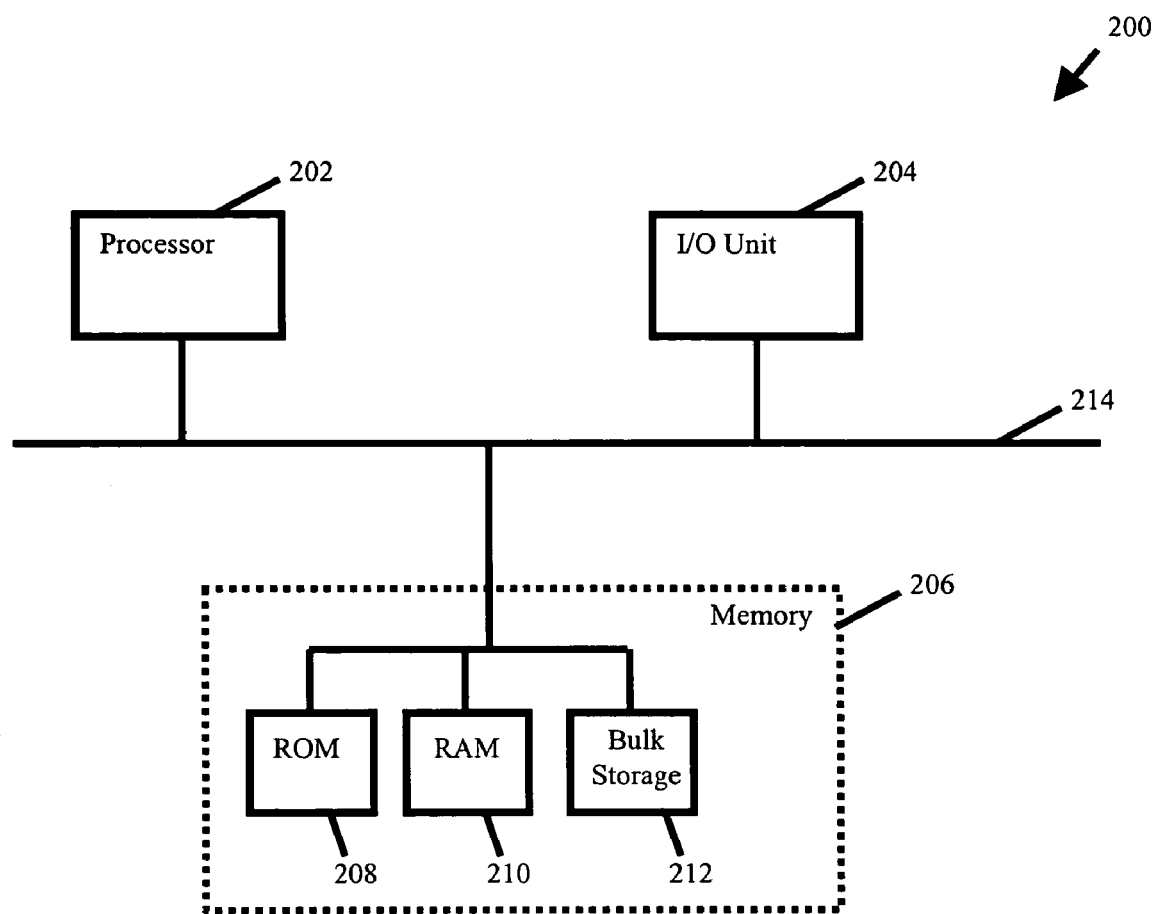
FIG. 2 is a system to evaluate hedge effectiveness in accordance with an embodiment of the invention.

It is noted that with respect to the exemplary tests of 106, 110A, 110B, and 110C that the set of tests may be stored in a test method database which may be stored in memory (e.g., 206, FIG. 2). Test methods may include predefined and or user-defined test methods. As used herein, predefined test methods may include those test methods that are shipped with the system. User-defined test methods may include those test methods that a user develops using, for example, object oriented software, and which may be seamlessly incorporated into the system embodying the invention. It is also noted that illustration and description of several exemplary tolerance value checks 106 and three additional tests 110A, 110B, 110C, is not meant to be limiting as to quantity or scope and any quantity of tests and any scope of test methodologies embodied by those tests may be included without departing from the scope of the invention.

In one embodiment, the set of test methods may include one or more test methods. While the entirety of the set may be used, nothing herein restricts use to the entire set. Consequently, in one embodiment, a subset of the set of test methods may be used test the effectiveness of a hedge. In one embodiment, each of the hedges may have indicated, for example in the information associated with the hedge (see, e.g., 104), those test methods that are to be used to test the effectiveness of the hedge. In another embodiment, each hedge may be tested by each of the test methods in the set of test methods and an indication of test methods to be used may be redundant. Accordingly, in another embodiment, each hedge may be tested using every test method in the set of test methods, without a need for any individual test method(s) to be identified in the information, if any, associated with each hedge.

Examples of test methods that may be used in an embodiment of the invention may include offset methods, regression analysis methods, and/or market data shift methods. An offset test method may be described as a retrospective (hedge) effectiveness test, in which the measurement of the effectiveness of a hedge relationship is evaluated by making a comparison between the (hedge) fair value changes of all underlying and hedge transactions since the establishment of the hedge. Temporary ineffectiveness can be smoothed out by observing all the changes in fair value during the hedge's life span. By way of example, a conventional offset method may create a measure of a hedge's effectiveness (i.e., a hedge ratio) by dividing the full fair value of the hedged items by the full fair value of the hedging items. As used herein, the words "full fair value" means a hedge's attributable market value.

A regression method may use statistical procedures to measure a relationship between the various factors (explanatory variables) and figures (variables that are to be explained). The regression method can be used to clarify whether there is any link between the factors and figures, and which link is the most suitable in a model class (for example, linear functions). As part of an effectiveness measurement, the change in value of the hedging item is the variable, which is to be explained, whereas the change in value of the hedged item is the explanatory variable. The effectiveness of a hedge relationship can be judged on the basis of such a regression analysis.

These brief descriptions are supplied by way of background only. It is again noted that identification of any of the above-identified test methods is not meant to limit any embodiment of the invention to the use of those test methods.

Test methods may be retrospective or prospective. A retrospective test method may use actual historical data in its test method formulae. A prospective test method may use forecasted data in its test method formulae. Those of skill in the art will understand the appropriate use and composition of retrospective and prospective test methods for use in effectiveness testing. The details of these methods are not important for the present discussion. In one embodiment, however, it is preferable to identify whether a test method is a retrospective or a prospective test method. This information may be used, for example, in a final evaluation of the results of each test method; it may be used to give weight to a result.

At 106, one or more tolerance value checks may be executed. The tolerance value check may be a test method that may serve as a first evaluation as to whether other test methodology to evaluate hedge effectiveness are necessary. Some reasons not to execute other methods of evaluating hedge effectiveness may include the recognition of only minor value changes in hedged or hedging instruments, hedging relationships that were designated only a few days earlier, or a hedging relationship that is to be dissolved in a relatively short period of time. The previous reasons are exemplary and not meant to be limiting. The various test methods of the tolerance value checks need not be dependent on one another and can be called individually. The various test methods of the tolerance value checks may call other functions. If an error occurs in any of the functions, the system may output an error message to be stored in an application log, which may be stored in memory (e.g., 206, FIG. 2).

In one embodiment, a tolerance value check may include an evaluation of a change in the value of a hedge. The change in value of the fair value of a hedge and the amortized cost of hedge may be considered for all underlying and hedge transactions. When the changes in value are minor, it may not be necessary to perform additional effectiveness test calculations.

In one embodiment, a tolerance value check may evaluate a maturity date of a hedge. When the maturity range of the hedge is small (i.e., the date to maturity is within a predefined period), it may not be necessary to perform additional effectiveness tests.

In one embodiment, when calculating the difference between the dates, the system uses a calendar that does not distinguish between workdays and public holidays.

Returning now to 108, a determination is made as to whether other test methods, different from the tolerance value checks 106, are to be executed. At 108, if no other test methods are to be executed then, at 120, a final effectiveness indicator may be set according to the results of the tolerance value check. In other words, for example, if a tolerance value check indicates the hedging relationship to be effective, the system may set the final effectiveness indicator to effective, without calling up other test methods (e.g., the test methods of 110A, 110B, 110C).

If at 108, it is determined that other test methods are required, at 110A, 110B, 110C, other test methods may be called. Each test method 110A, 110B, 110C, may have a separate effectiveness indicator, which depending on the test method, is incorporated in the indicator for a retrospective or prospective effectiveness test (e.g., at 112, 114, respectively). The individual test methods 110A, 110B, 110C, may set the retrospective 112 and prospective 114 effectiveness flags in an order defined in a test schema. The test schema may be a list of test methods. The test schema may identify an order in which the test methods may proceed. The test schema may be user defined or predefined.

Returning now to 116, a determination may be made as to whether each of the one or more test methods 110A, 110B, 110C that may be used to evaluate the hedge has been executed. If not, the system may execute a next one of the test methods by returning to 108. If so, the method may continue to 118.

At 118, an evaluation of the set of test results of each of the test methods may be undertaken. In one embodiment, a rule set may be applied to the set of test results in order to provide a final indication of effectiveness based on the set of test results. This final indication of effectiveness may be referred to herein as a final effectiveness indicator. As described above in relation to the test methods themselves, the rule set may also be predefined or user defined. Ability to implement user defined rule sets may allow a user to customize the evaluation to suit unique requirements that may be imposed, for example, by different government agencies.

At 118, to ensure the test produces an unambiguous result, the system may derive the final effectiveness indicator from the set of test results (including retrospective and prospective effectiveness indicators) through application of a rule set. The rule set may be stored, for example, in a rule set array in memory (e.g., 206, FIG. 2). One example of a rule set is illustrated in Table One. As used in Table One, the word "Initial" means that the flag (i.e., the effectiveness indicator) has no current value. In other words, the word "Initial" signals that no test has been performed.

TABLE ONE

| Retrospective Effectiveness Indicator | Prospective Effectiveness Indicator | Final Effectiveness Indicator |
|---|---|---|
| Initial | Initial | Error when calculating effectiveness |
| Initial | Error when calculating effectiveness | Error when calculating effectiveness |
| Initial | Effective | Effective |
| Initial | Ineffective | Ineffective |
| Error when calculating effectiveness | Initial | Error when calculating effectiveness |
| Error when calculating effectiveness | Error when calculating effectiveness | Error when calculating effectiveness |
| Error when calculating effectiveness | Effective | Effective |
| Error when calculating effectiveness | Ineffective | Ineffective |
| Effective | Initial | Effective |
| Effective | Error when calculating effectiveness | Effective |
| Ineffective | Initial | Ineffective |
| Ineffective | Error when calculating effectiveness | Ineffective |
| Ineffective | Effective | Effective |
| Ineffective | Ineffective | Ineffective |
| Temporarily ineffective | Initial | Effective |
| Temporarily ineffective | Effective | Effective |
| Temporarily ineffective | Ineffective | Ineffective |

The rule set, as exemplified in Table One, provides an adjustable set of rules that may be used to derive the final effectiveness indicator from the set of test results. Table One identifies just one possible truth table for the derivation of a final flag result.

According to the rule set, the calculation of the effectiveness key figures is dependent on the method of measurement. In the case of ineffectiveness, the ineffectiveness may have to be determined by date.

By way of example of one possible test in a plurality of effectiveness tests, when using the offset method, two steps may be followed to calculate effectiveness for accounting purposes. The first step may involve determining whether the hedge relationship is effective. The second step may involve determining whether the hedge relationship is temporarily ineffective. If a hedge relationship is effective, it may not need to be checked for temporary ineffectiveness. Accordingly, an initial check is preferably made to ascertain whether the hedge relationship is effective or not. The number of key dates on which temporary ineffectiveness was present may be derived from an effectiveness measurement history as well as the key values of whether a measurement was used during the course of a key date evaluation. It is noted that in one embodiment and with respect to the offset method, the hedge relationship is ineffective when it is neither effective nor temporarily ineffective.

FIG. 2 is a system to evaluate hedge effectiveness in accordance with an embodiment of the invention. It is noted that the functionality of the foregoing embodiments may be provided on various computer platforms executing program instructions. One such platform 200 is illustrated in the simplified block diagram of FIG. 2. There, the platform 200 is shown as being populated by a processor 202, an input/output (I/O) unit 204, and a memory system 206. The processor 202 may be any of a plurality of conventional processing systems, including microprocessors, digital signal processors and field programmable logic arrays. In some applications, it may be advantageous to provide multiple processors (not shown) in the platform 200. The processor(s) 202 execute program instructions stored in the memory system 206. The memory system 206 may include any combination of conventional memory circuits, including electrical, magnetic or optical memory systems. As shown in FIG. 2, the memory system may include read only memories 208, random access memories 210 and bulk storage 212. The memory system not only stores the program instructions representing the various methods described herein but also can store the data items on which these methods operate. The I/O unit 204 may permit communication with external devices (not shown). A communications bus 214 may couple all components and/or units or subunits of the platform 200.

The disclosed embodiments are illustrative of the various ways in which the invention may be practiced. Other embodiments can be implemented by those skilled in the art without departing from the spirit and scope of the invention.

What is claimed is:

1. A computer implemented method to determine hedge effectiveness, comprising:
   selecting, by a computer processor, a hedge from a plurality of hedges;
   selecting, by the computer processor, an initial test from a plurality of tolerance value checks, wherein the initial test is a first evaluation to determine whether other test methodologies to evaluate hedge effectiveness are necessary;
   setting, by the computer processor, a final indicia for the hedge as effective if the initial test indicates no other tests need to be executed;
   selecting, by the computer processor, a first test method from a plurality of effectiveness test methods if the initial test indicates other tests need to be executed, wherein the effectiveness test methods include prospective test methods and retrospective test methods, wherein the prospective test methods use actual historical data in respective test method formulae and the prospective tests use forecast data in respective test method formulae;
   calculating, by the computer processor, a first test result of the first test method;
   storing, by the computer processor, the test result in a first memory location;
   repeating, by the computer processor, the calculating and the storing for each of the plurality of effectiveness test methods to store a plurality of test results; and
   determining, by the computer processor, the final indicia of hedge effectiveness by applying a rule set to the stored plurality of test results, wherein the rule set is adjustable by a user and comprises a plurality of rules, each rule generates a final effectiveness indicator based on the plurality of test results collectively.

2. The method of claim 1, further comprising:
   reading information concerning the selected hedge from a second memory location, the information comprising at least a hedge start date, hedge stop date, and hedge basis currency.

3. The method of claim 1, further comprising:
   reading information concerning the selected hedge from a second memory location, the information comprising at least a designation of which of the plurality of test methods are to be selected for calculating.

4. The method of claim 1, wherein each of the plurality of test methods is selected based on a test schema, the test schema is user defined or predefined and identifies an order in which the test methods may proceed.

5. The method of claim 1, wherein each stored test result is associated with an indicia of a type of test method from which it was calculated.

6. The method of claim 5, wherein each test result is associated with an indicia of whether the test method was a prospective test method or a retrospective test method.

7. The method of claim 1, further comprising storing the final indicia of hedge effectiveness in a second memory location.

8. The method of claim 1, wherein the rule set defines rules to derive the final effectiveness indicator from a set of conditions, the conditions are predefined, user defined, or both.

9. The method of claim 1, wherein the initial test comprises at least one of a test to evaluate a change in the value of a hedge from a first time to a second time later than the first and a test to evaluate a maturity date of a hedge.

10. A system comprising:
a processor; and
a memory, the memory including a set of instructions to be executed by the processor, the instructions comprising instructions to:
select a hedge from a plurality of hedges;
select an initial test from a plurality of tolerance value checks, wherein the initial test is a first evaluation to determine whether other test methodologies to evaluate hedge effectiveness are necessary;
set a final indicia for the hedge as effective if the initial test indicates no other tests need to be executed;
select a first test method from a plurality of effectiveness test methods if the initial test indicates other tests need to be executed, wherein the effectiveness test methods include prospective test methods and retrospective test methods, wherein the prospective test methods use actual historical data in respective test method formulae and the prospective tests use forecast data in respective test method formulae;
calculate a first test result using the first test method;
store the first test result as calculated by the use of the first test method in a first memory location;
repeat the calculating and the storing for each of the plurality of effectiveness test methods to store a plurality of test results; and
determine the final indicia of hedge effectiveness by applying a rule set to the plurality of test results, wherein the rule set is adjustable by a user and comprises a plurality of rules, each rule generates a final effectiveness indicator based on the plurality of test results collectively.

11. The system of claim 10, further comprising:
reading information concerning the selected hedge from a second memory location, the information comprising at least a hedge start date, hedge stop date, and hedge basis currency.

12. The system of claim 10, wherein the instructions further comprising an instruction to:
read information concerning the selected hedge from a second memory location, the information comprising at least a designation of which of the plurality of test methods are to be selected for calculating.

13. The system of claim 10, wherein each of the plurality of test methods is selected based on a test schema, the test schema is user defined or predefined and identifies an order in which the test methods may proceed.

14. The system of claim 10, wherein each stored test result is associated with an indicia of a type of test method from which it was calculated.

15. The system of claim 14, wherein each stored test result is associated with an indicia of whether the test method was a prospective test method or a retrospective test method.

16. The system of claim 10, wherein the instructions further comprising an instruction to store the final indicia of hedge effectiveness in a second memory location.

17. The system of claim 10, wherein the rule set defines rules to derive the final effectiveness indicator from a set of conditions, the conditions are predefined, user defined, or both.

18. The system of claim 10, wherein the initial test comprises at least one of a test to evaluate a change in the value of a hedge from a first time to a second time later than the first and a test to evaluate a maturity date of a hedge.

* * * * *